United States Patent [19]

Edwards

[11] Patent Number: 4,962,348
[45] Date of Patent: Oct. 9, 1990

[54] SWITCHED FILTER WITH LOW OFFSET

[75] Inventor: Arthur J. Edwards, Hoffman Estates, Ill.

[73] Assignee: Motorola, Inc., Schaumburg, Ill.

[21] Appl. No.: 332,126

[22] Filed: Apr. 3, 1989

[51] Int. Cl.⁵ .............................................. H02J 7/14
[52] U.S. Cl. ...................................... 322/58; 322/28; 322/73
[58] Field of Search ............................. 322/58, 28, 73

[56] References Cited

U.S. PATENT DOCUMENTS

| | | | |
|---|---|---|---|
| 3,560,840 | 2/1971 | Stalp | 322/58 X |
| 3,593,113 | 7/1971 | Wiley | 322/58 X |
| 4,340,849 | 7/1982 | Kuhn | 322/58 X |
| 4,636,705 | 1/1987 | Bowman | 322/73 X |

*Primary Examiner*—R. J. Hickey
*Attorney, Agent, or Firm*—John H. Moore

[57] ABSTRACT

A switchable filter has characteristics (e.g., time constant) that are changed by a low offset, bipolar switch that is turned off and on to periodically connect/disconnect an additional circuit element to the filter. The preferred embodiment is specially designed for use in an automotive voltage regulator.

12 Claims, 3 Drawing Sheets

4,962,348

SWITCHED FILTER WITH LOW OFFSET

FIELD OF THE INVENTION

This invention is directed to the field of electronic filters that require switchable impedances, and particularly to such filters as may be used in automotive voltage regulators.

BACKGROUND OF THE INVENTION

Electronic filters, such as simple RC filters, for example, are sometimes used in applications where it is desirable to change the characteristics of the filter. For example, a particular filter may work best with a fast time constant under certain circumstances, but under different circumstances a relatively slow time constant may be required. Switching one or more impedances into or out of circuit with the filter is one way to effectively change the filter's characteristics. However, in applications where the filter and its associated circuitry are constructed using semiconductors of the bipolar type (as opposed to MOS types), it is very difficult to construct a bipolar-type switch that does not introduce an undesirable high level of voltage offset.

The foregoing switching problem and its attendant offset are issues that confront the designers of bipolar automotive voltage regulators, because such regulators use filters that could benefit from a truly switchable filter with no discernable offset. Accordingly, the following discussion will describe this issue as it pertains to automotive voltage regulators.

The typical electronic regulator modifies the excitation applied to an alternator's field winding so as to hold the alternator's output voltage close to a desired mean value. This is usually achieved by periodically pulse-width-modulating the excitation voltage applied to the field winding so that the "on" time of the excitation voltage varies over a given regulation cycle (each regulation cycle may typically last for about 20 milliseconds). Where a larger alternator output voltage is called for, the "on" time of the excitation voltage is increased.

As described in more detail below, switching the excitation voltage off and on causes relatively large and undesired voltage steps to appear in the output of the alternator that is sensed by the regulator. These steps, plus other undesired transient voltages, are conventionally applied to a filter (typically, an R-C filter) prior to being processed by the regulator. If the filter is not able to quickly recover from the switching-induced voltage steps, improper regulation can occur. One undesirable result of such improper regulation is an apparent reduction of the regulation frequency from 50 Hz (typically) to 25 Hz. This change in frequency can manifest itself in visible headlight flicker, an obviously objectionable result.

As mentioned above, the cause of this problem is the inability of the regulator's filter to quickly recover from the switching-induced voltage steps. This recovery should preferably occur during the regulator's minimum "on" time (a minimum interval when excitation is always being applied to the alternator's field winding) which may be as small as 1 millisecond. Thus, a filter with a fast time constant is called for. On the other hand, the filter's time constant needs to be relatively long to effect good regulation under all operating conditions. Both of these concerns could be met by a switchable filter, but no such filter, in bipolar form, has been available except for those which introduce too much offset to be practical.

OBJECTS OF THE INVENTION

It is a general object of the invention to provide an improved switchable filter which overcomes the above-described problems.

It is a more specific object of the invention to provide a bipolar switchable filter that introduces no objectionable offset.

It is yet another object of the invention to provide an automotive voltage regulator which employs a bipolar switchable filter so as to handle the above-described voltage steps without any apparent reduction in the frequency of regulation.

DESCRIPTION OF THE PREFERRED EMBODIMENT

As discussed above, a bipolar switchable filter is particularly well suited to solve certain problems associated with automotive voltage regulators. Accordingly, the switchable filter according to this invention will be described in terms of an embodiment that has been designed specifically for use with an automotive voltage regulator. It should, however, be understood that the invention may be used in other applications where a bipolar switchable filter is useful.

Figure 1:
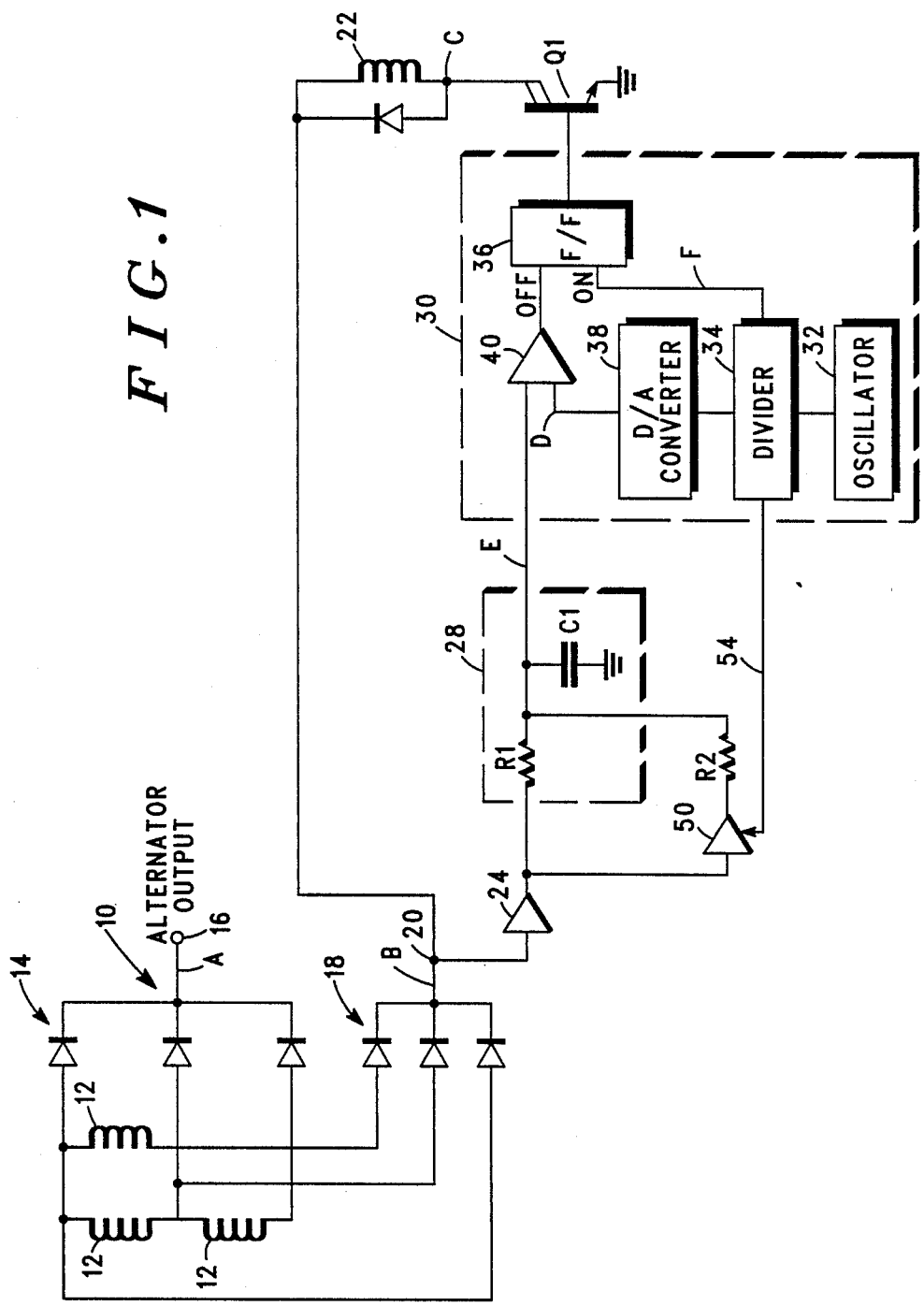
FIG. 1 is a schematic diagram of a regulator that has been modified to include a switchable bipolar filter per this invention, plus the relevant portions of an alternator whose output is controlled by the regulator.

Referring now to FIG. 1, a portion of an alternator 10 is shown which includes three conventional stator windings 12 interconnected in the conventional manner to develop an electrical output when the alternator's rotor is rotated. The outputs from these three windings are coupled through diodes 14 to an alternator output terminal 16 which is typically coupled to a battery (not shown) in an automotive vehicle.

The output of the alternator's stator windings is sensed by coupling those windings through a so-called diode trio 18 to another output terminal 20 which acts as an input to an electronic voltage regulator. The amplitude of the alternator's voltage at the terminal 20 is compared to a reference voltage within the regulator and, depending on the relative amplitude of the alternator's voltage at terminal 20, a drive transistor Q1 will be selectively turned on and turned off in order to provide excitation to the alternator's field winding 22.

To control the conduction of the transistor Q1, the output signal from the diode trio 18 is coupled, via a buffer amplifier 24 having a gain of unity, to the input of a filter 28 which may be a low pass filter comprising a resistor R1 and a capacitor C1 (these may be discrete components or they may be "effective" components that comprise one or more individual components plus distributed or amplified values of resistance and capacitance).

The output signal from the filter 28 is coupled to the input of a processing circuit 30 whose basic function is to sense the output signal from the filter, compare it to an internally generated reference signal, and terminate the excitation of the field winding 22 when the filter's output signal is greater than a predetermined level; the processing circuit 30 turns on the excitation for the field winding 22 for at least a minimum "on" time during each cycle of regulation.

In the illustrated embodiment, the processing circuit 30 includes an oscillator 32 which operates at a fixed frequency, a divider 34 which divides down the oscillator signal by a convenient scaling factor to generate an output signal of 50 Hz, for example. One output from the divider 34 is coupled to the "on" input of a flip-flop 36 while another output therefrom is coupled to a digital-to-analog converter 38. The output of the converter 38 is a periodic ramp signal which is coupled to one input of a comparator 40. The other input to the comparator 40 is received from the output of the filter 28. The output of the comparator 40 is, in turn, coupled to the "off" input of the flip-flop 36, the latter device having an output which is used to turn the transistor Q1 off and on, thereby turning off and on the excitation to the field winding 22.

The operation of the charging system will now be described in more detail in order to illustrate the problems which the present invention overcomes.

Figure 2:
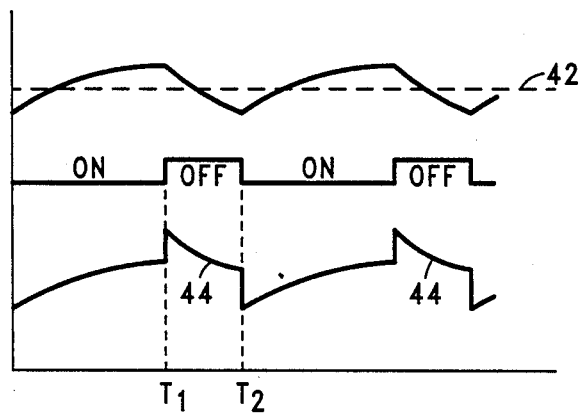
FIGS. 2, 3 and 4 show various waveforms that are useful in describing the operation of the circuitry shown in FIGS. 1 and 5.

Referring to FIG. 2, waveform A illustrates the alternator output voltage that is generated on lead A (terminal 16) in FIG. 1. Likewise, waveform B illustrates the voltage output from the diode trio 18 as it appears on lead B (at terminal 20), and waveform C of FIG. 2 illustrates the excitation voltage that is present at terminal C (at the collector of Q1) in FIG. 1. Basically, and as mentioned previously, the transistor Q1 is selectively turned off and on to modulate the excitation applied to the field winding 22 in order to maintain the alternator output (waveform A) at a desired mean level indicated by the dashed line 42 in FIG. 2. The waveform B differs from waveform A in that the former includes voltage spikes or steps 44 that are induced in the voltage at the output of the diode trio 18 due to the switching off and on of the excitation applied to the field coil 22 and the resultant voltage drop across the three diodes in the diode trio 18. For example, when the field excitation is turned off at time T1 in FIG. 2, the resultant decrease in current flowing through the diode trio 18 to the field winding 22 causes the voltage at terminal 20 to increase abruptly as shown. That voltage declines gradually (as shown by waveform B) until time T2 when the field excitation is turned on, thereby causing a sharp increase of current through the diode trio and causing the voltage at terminal 20 to decrease abruptly. Similar voltage steps are induced in the voltage output from the diode trio during each cycle of regulation, and it is these voltage steps which, as described in more detail below, give rise to the problems associated with filters in conventional regulators.

Figure 3:
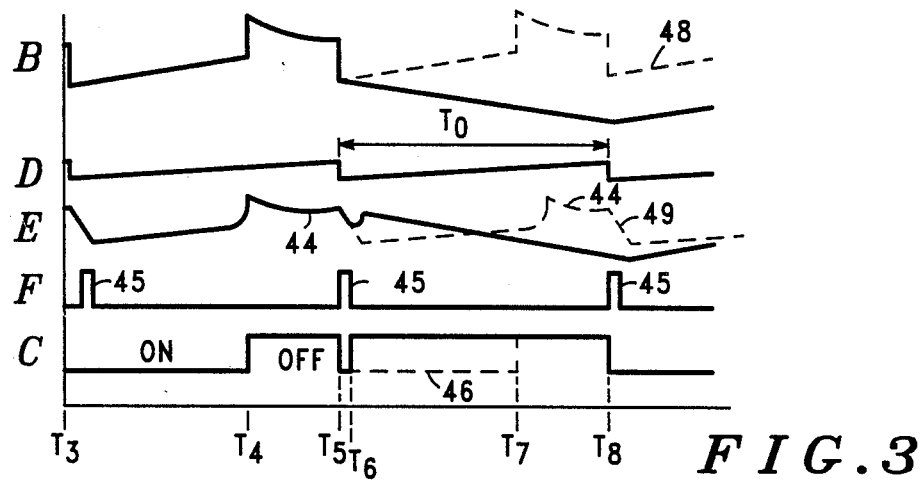

Referring now to FIG. 3 and also to FIG. 1, the convertor 38 generates a reference ramp output which is illustrated as waveform D in FIG. 3. One such ramp is generated for each cycle of regulation, and T0 indicates the period associated with one such cycle.

The waveform D is applied as one input to the comparator 40. The other input to the comparator 40, taken from the output of lowpass filter 28, is shown as waveform E (the solid line portion of waveform E represents actual conditions that can occur with a non-switchable filter. The dashed line portion represents the preferred output from the filter). When the amplitude of waveform E exceeds the amplitude of the reference waveform D, the output of the comparator 40 goes high to turn off the flip-flop 36. Otherwise, the flip-flop 36 remains on and its output remains high to actuate the transistor Q1 to excite the field winding 22.

The output of the divider 34 is illustrated as waveform F in FIG. 3. As shown, waveform F comprises small, periodic ON pulses 45 which occur once during each cycle of regulation. Typically, the ON pulses 45 are generated at a 50 Hz rate and the duration of each pulse is held constant at about 1 ms. Consequently, the flip-flop is forced on by a pulse 45 for a minimum "on" time of 1 ms. during each cycle of regulation, irrespective of the output of the comparator 40.

With reference again to FIG. 3, a cycle of operation will be described beginning at the time shown as T3 (in FIG. 3 the waveforms B through F correspond to voltages at the correspondingly labeled points in FIG. 1). At time T3, the divider 34 is in the process of outputting a pulse 45, thus causing the field excitation to be "on" as shown by waveform C. Immediately after the conclusion of the first pulse 45 and up until time T4, the amplitude of waveform D, as measured by the comparator 40, exceeds the amplitude of waveform E, therefore the comparator 40 fails to turn the flip-flop 36 off. Thus, the flip-flop 36 and the field excitation remain "on" for the period between times T3 and T4.

At time T4, the amplitude of waveform E exceeds the amplitude of waveform D, whereupon the comparator 40 turns the flip-flop 36 off, thus also turning off Q1 and the field excitation. The field excitation remains off by operation of the comparator 40 until time T5 when an ON pulse 45 is generated by the divider 34, thus turning the flip-flop and the field excitation on and holding it on for the duration of pulse 45, i.e., from T5 to T6. After the enforced "on" time caused by the pulse 45, the field excitation may be again turned off by operation of the comparator 40 whenever the amplitude of the waveform E exceeds the amplitude of the waveform D, and this is precisely what now erroneously occurs at time T6.

Conventionally, the filter 28 has a relatively long time constant in order to provide good regulation over the entire regulation cycle. Unfortunately, this also means that the filter 28 is unable to quickly recover from the influence of the voltage step 44 that was just induced into waveform E by virtue of the switching of the field excitation between times T4 and T5. Consequently, the output of the filter (waveform E) remains high (as shown by the solid line portion of waveform E following T5) for a relatively long period of time during which its amplitude exceeds the amplitude of the waveform D. As a result, the output of the comparator 40 turns the flip-flop and the field excitation off at time T6 and holds it off until time T8. Stated differently, the relatively long time constant associated with the filter 28 causes it to be unable to recover from the influence of the step 44 (which occurred between time T4 and T5) and thus holds its output at a relatively high level (higher than the level of the reference waveform D), thus erroneously turning the flip-flop 36 off during the period from T6 to T8, thereby also turning off the excitation to the field winding 22.

It can be seen from waveform C (the solid line portion of waveform C) that the erroneously long "off" time associated with the field excitation causes the period of the field excitation to appear twice as long as it ordinarily would be, thus effectively reducing the regulation frequency and permitting flicker to be seen in the headlights of the vehicle which incorporates this type of regulator. See also waveform B in FIG. 3 which shows how the output from the diode trio 18 declines between times T5 and T8 (the solid line portion of waveform B) before resuming an upward increase at time T8. Had the regulator not been "fooled" by the inability of the filter 28 to respond to the voltage steps 44, the field excitation would have been turned on between times T6 and T7, as indicated by the dashed line 46 in waveform C. In that case, the output of the diode trio, waveform B, would have been correct as shown by the dashed line 48, and the output of the filter 28, waveform E, would have been as shown by the dashed line 49.

To solve the problems caused by the inability of the filter 28 to properly recover from the effects of the voltage steps 44, the present invention provides a filter whose characteristics are switched (changed) in synchronism with the switching off and on of the excitation to the field winding 22. The switching is effected by circuitry that provides minimal voltage offsets, if any.

As previously stated, the invention is not limited to use with automotive charging systems. Rather, the invention may be used in any appropriate system that provides an output signal (e.g. waveform B) that is received, filtered and processed by a control circuit (e.g., filter 28 and processing circuit 30) that controls the value of the output signal by switching a control signal (e.g.,the output of flip-flop 36 or waveform C). Broadly stated, the improved control circuit includes a filter that receives the output signal and that has one or more filter elements (e.g. R1, C1) that determine the characteristics of the filter, thus to develop a filtered output signal; processing circuitry that receives the filtered output signal for switching the control signal off and on; and switching means coupled to the filter and responsive to the switching of the control signal for modifying the effective value of at least one of the filter elements in synchronism with the switching of the control signal so as to synchronously modify the filter's time constant.

With reference to FIG. 1, the switching means is shown as including an electronic buffer 50 that preferably has a gain of unity. This buffer 50 acts as an electronic switch and, as described in more detail below, is a bi-polar electronic buffer that has an "on" state in which it acts as a low impedance device (i.e., a closed switch), and an "off" state in which it acts as a relatively high impedance device (i.e., an open switch). The term "bi-polar" means that the device is constructed, at least primarily, of bi-polar transistors, as distinguished from MOS (metal oxide semiconductor) transistors.

As shown, the buffer 50 is coupled in series with an impedance element which, in the illustrated embodiment, is a resistor R2. Generally, the buffer 50 is turned off and on in synchronism with the switching of the excitation of the field coil 22, as by switching the buffer 50 off and on by means of an output from the divider 34 via a lead 54. As will be shown, the buffer 50 is preferably switched to its "on" state when the ON pulse 45 causes the field coil 22 to be energized, thereby placing the resistor 52 effectively in parallel with the resistor R1. Consequently, the time constant of the filter 28 is made faster so as to recover quickly from a switching-induced step in the output voltage from the diode trio. After recovery, the buffer 50 is turned off to remove the resistor R2 from the filter circuit, thus allowing the filter 28 to revert to its larger time constant.

Figure 4:
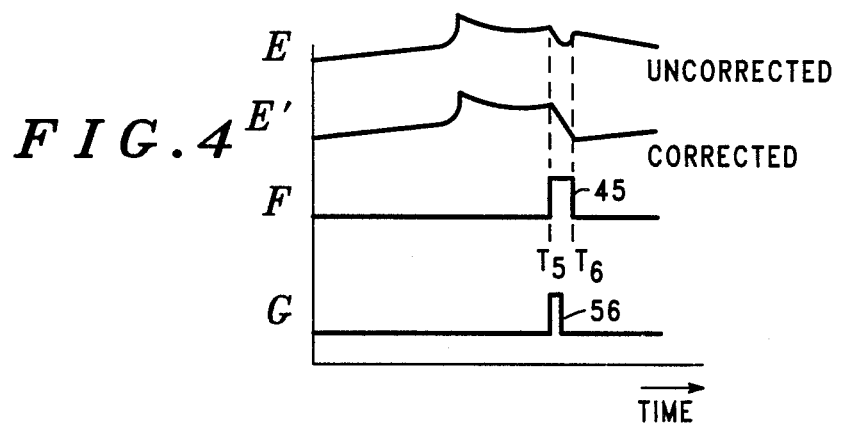

The effects of the foregoing are shown in FIG. 4 to which reference is now made. Waveform E represents the output from the diode trio during a voltage step when the filter 28 has its conventional long (uncorrected) time constant, i.e., without the benefit of the buffer 50 and the resistor R2; waveform E' represents the output of the diode trio when the buffer 50 is used to give the filter 28 a faster time constant during a small part of the regulation cycle; waveform F illustrates the ON pulse 45 that has been previously discussed; and waveform G illustrates a new pulse 56 that may be derived from the pulse 45 as will be discussed later.

In order to switch the buffer 50 on and off, it is convenient to use either the ON pulse 45 or the pulse 56. The use of this pulse 45 will be described first. Waveform E' of FIG. 4 assumes that the pulse 45 is being used.

As shown, waveform E is not able to decline rapidly in the interval between T5 and T6 because its time constant is too long. The solid line waveform E in FIG. 3 shows the same condition over a longer time period. By using the pulse 45 to switch the buffer 50 on at time T5, via the lead 54 (FIG. 1), the time constant of the filter 28 is reduced, thereby allowing the voltage output of the filter 25 to decline rapidly as shown by waveform E'. At time T6, the pulse 45 undergoes a negative transition which causes the buffer 50 to turn off, thereby removing the effect of R2 and permitting the filter 28 to revert to its longer time constant as determined by R1 and C1. By repeatedly switching the buffer 50 on and off in synchronism with the ON pulse 45, the voltage out of the filter 28 is as shown by the waveform E' (and by the dashed portion 49 of waveform E in FIG. 3). The output of the diode trio then appears as shown by the dashed line 48 of waveform B in FIG. 3.

It should be understood that it is not crucial that the buffer 50 be left in its "on" condition for the entire interval, T5-T6, of the ON pulse 45. The buffer need merely be left on for a sufficient time to permit the filter 28 to adequately recover from a voltage step. In fact, it is preferable in the case of an automotive regulator to use a short on time for the buffer 50. This is the reason for the pulse 56 which begins at time T5 and ends at a time that is halfway between T5 and T6. This is the type of pulse that is used in a preferred embodiment that is illustrated in FIG. 5.

Figure 5:
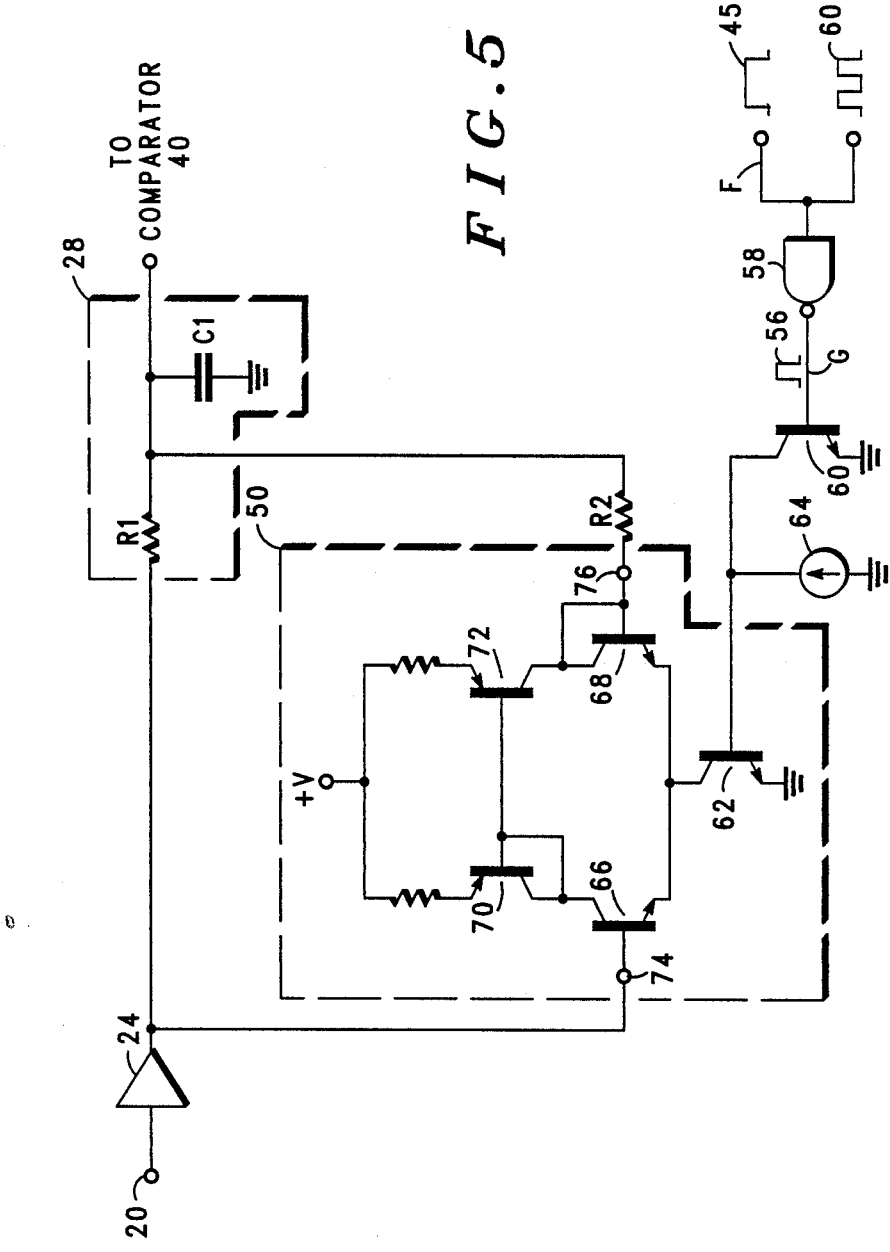
FIG. 5 is a schematic diagram that shows a more detailed embodiment of the switchable filter shown in FIG. 1.

Referring now to FIG. 5, the pulse 45 is shown as being applied to an input gate 58. This gate 58 also receives a pulse train 60 which includes pulses that are half the width of the pulses 45. Such a pulse train 60 is normally available from within the divider 34 (FIG. 1) which conventionally includes a high frequency oscillator and a frequency divider to set the regulator's operating frequency. The pulses 45 and 60 are conventionally obtained from open collector I$^2$L gates within the divider 34 and, therefore, may be applied to the input gate 58 to generate the pulse 56 (waveform G in FIG. 4). This pulse 56 is coupled to the base of the transistor 60 whose collector is coupled to the base of another transistor 62 that forms part of the electronic buffer (switch) 50. A current source 64 provides bias current to the bases of the transistors 62 and 60 so that the current established in transistor 60 is mirrored in transistor 62.

The illustrated embodiment of the buffer 50 comprises bipolar transistors 66 and 68 that are configured to form a differential amplifier, with a current source formed by the transistor 62. A collector load for the differential amplifier comprises PNP transistors 70 and 72 that are connected with the differential amplifier in a known current mirror configuration.

The buffer thus formed has unity gain, with an input terminal 74 and an output terminal 76. By virtue of connecting the base of transistor 68 to its collector, and the equal currents through transistors 66 and 68, the voltage at output terminal 76 follows the voltage at input terminal 74. Accordingly, virtually no dc offset is introduced between the terminals 74 and 76.

The input terminal 74 couples to one side of the resistor R1, while the output terminal 76 couples to the other side of the resistor R1 through the resistor R2. Thus, upon the occurrence of each pulse 56, the buffer 50 is turned on and connects the resistor R2 in parallel with the resistor R1, to thereby provide a faster time constant for the filter 28 for the duration of each pulse 56.

Significantly, the bipolar buffer 50 has negligible dc offset when it is turned on so that a very low impedance path is formed between the terminals 74 and 76. Accordingly, the only effect of switching the buffer off and on is to change the time constant of the filter 28, as desired.

The embodiments illustrated herein all show a pair of resistors between switched in and out of a parallel relationship with each other. However, it should be understood that other impedance elements, such as inductors and capacitors, may also be connected and disconnected from similar or different types of filter elements by means of the present form of switching arrangement.

Although the invention has been described in terms of a preferred embodiment, it will obvious to those skilled in the art that many variations and alterations may be made without departing from the invention. Accordingly, it is intended that all such alterations and variations be considered within the spirit and scope of the invention as defined by the appended claims.

What is claimed is:

1. In a system that provides an output signal that is received, filtered and processed by a control circuit that controls the value of the output signal by switching a control signal, an improved control circuit for reducing the effect of switching-induced steps in the output signal, comprising:
   a filter receiving the output signal, the filter having one or more filter elements that determine the time constant of the filter, and generating a filtered output signal;
   processing circuitry receiving the filtered output signal for switching the control signal off and on; and
   switching means coupled to the filter and responsive to the switching of the control signal for modifying the effective value of at least one of the filter elements in synchronism with the switching of the control signal so as to synchronously modify the filter's time constant.

2. A control circuit as set forth in claim 1 wherein the switching means includes a bi-polar electronic buffer having an "on" state and an "off" state and being coupled in series with an impedance element, means coupling the combination of the buffer and the impedance element in circuit with at least one of the filter elements, and means for turning the buffer "on" and "off" in synchronism with the switching of the control signal.

3. A control circuit as set forth in claim 2 wherein the bi-polar electronic buffer has a gain of unity.

4. A control circuit as set forth in claim 3 wherein the bi-polar electronic buffer includes a plurality of bi-polar transistors configured to form a differential amplifier that has an input terminal, an output terminal and a current mirror forming a collector load for the differential amplifier, the input terminal being coupled to one side of said one filter element, and the output terminal being coupled through the impedance element to the other side of the same filter element.

5. A control circuit as set forth in claim 1 wherein the system is an automotive charging system that includes an alternator and a voltage regulator, wherein the filter, the processing circuitry and the switching means are part of the voltage regulator which switches excitation to the alternator's field winding off and on, and wherein the switching means modifies the value of at least one of the filter elements to cause the filter to switch to a relatively fast time constant when the field excitation is turned on, and to switch to a relatively slower time constant at a predetermined time after switching to the fast time constant.

6. For use in a vehicle charging system that includes: (a) an alternator with a field winding that is excited by a regulator and a diode trio that provides an output from the alternator, and (b) a regulator with a filter having one or more filter elements for filtering the output of the diode trio, and with circuitry for turning off and turning on the excitation to the field winding, the improvement comprising:
   a bi-polar, unity gain, electronic buffer having a low impedance "on" state and high impedance "off" state;
   an impedance element coupled in series with the buffer;
   means for coupling the combination of the buffer and the impedance element in circuit with at least one filter element; and
   means coupled to the buffer and responsive to the turning on and turning off of the excitation to the field winding for switching the buffer "on" and "off" in synchronism with the turning on and turning off of the excitation to the field winding to thereby synchronously modify the characteristics of the filter.

7. The improvement as set forth in claim 6 wherein excitation is applied to the field winding for a minimum "on" time during each cycle of regulation, wherein the buffer is switched on for at least a portion of the minimum "on" time and is switched off a predetermined time thereafter.

8. The improvement as set froth in claim 7 wherein the regulator develops an ON pulse to excite the field winding during the minimum "on" time, and wherein said means for switching the buffer "on" and "off" is responsive to the ON pulse for switching the buffer to its "on" state.

9. The improvement as set forth in claim 8 wherein the buffer includes a plurality of bi-polar transistors configured to form a differential amplifier that has an input terminal, an output terminal, and a current mirror forming a collector load for the differential amplifier, the input terminal being coupled to one side of said one filter element, and the output terminal being coupled through the impedance element to the other side of the same filter element.

10. For use in a vehicle charging system that includes: (a) an alternator with a field winding that is excited by a regulator and a diode trio that provides an output from the alternator, and (b) a regulator with a filter having one or more filter elements for filtering the output of the diode trio and with circuitry for turning off and turning on the excitation to the field winding, the improvement comprising:

a bi-polar, unity gain, electronic switch having a low impedance "on" state and a high impedance "off" state;

an impedance element coupled in series with the switch;

means for coupling the combination of the switch and the impedance element in parallel with at least one of the filter elements means generating an ON pulse for turning on the field excitation for at least a minimum on time; and means receiving the ON pulse and being coupled to the switch for switching the switch to its "on" state responsive to the ON pulse, and for switching the switch to its "off" state no later than the termination of the ON pulse.

11. The improvement as set forth in claim 10 wherein the means for switching the switch includes circuitry for switching the switch to its "off" state midway between the beginning and the end of the ON pulse.

12. The improvement as set forth in claim 10 wherein the electronic switch includes a plurality of bi-polar transistors configured to form a differential amplifier that has an input terminal, an output terminal and a current mirror forming a collector load for the differential amplifier, the input terminal being coupled to one side of said one filter element, and the output terminal being coupled through the impedance element to the other side of the same filter element.

* * * * *